United States Patent Office 3,472,863
Patented Oct. 14, 1969

3,472,863
PREPARATION OF 2-AZOLIN-2'-YL-BENZIMIDAZOLES
George Holan, Brighton, Victoria, and Eva L. Samuel, Bentleigh, Victoria, Australia, assignors to Monsanto Chemicals (Australia) Limited
No Drawing. Filed Dec. 19, 1966, Ser. No. 602,509
Claims priority, application Australia, Dec. 29, 1965, 68,372/65
Int. Cl. C07d 91/22, 85/36, 49/34
U.S. Cl. 260—306.7                                   7 Claims

ABSTRACT OF THE DISCLOSURE 2-azolin-2'-yl-benzimidazoles of the formula

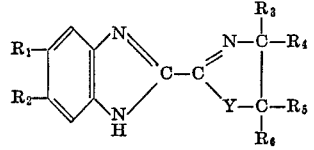

wherein $R_1$ and $R_2$ are each selected from the group consisting of hydrogen, halogen, alkyl of not more than 6 carbon atoms, and alkoxy of not more than 6 carbon atoms, Y is selected from the group consisting of —NH—, —S— and —O—, and $R_3$, $R_4$, $R_5$ and $R_6$ are selected from the group consisting of hydrogen and alkyl of not more than 6 carbon atoms, provided that where Y is —NH— or —S— at least one of $R_3$ and $R_4$ and at least one of $R_5$ and $R_6$ are hydrogen, are prepared by reacting a trihalomethylbenzimidazole of the formula

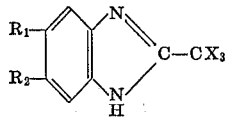

wherein $R_1$ and $R_2$ are as defined above and $X_3$ is selected from the group consisting of monochlorodifluoro and monofluorodichloro, with an amine of the formula $$H_2N \cdot CR_3R_4 \cdot CR_5R_6 \cdot YH$$

wherein Y, $R_3$, $R_4$, $R_5$ and $R_6$ are as defined above. The 2-azolin-2'-yl-benzimidazoles are useful as anthelmintics.

---

This invention relates to the preparation of 2-azolin-2-yl-benzimidazoles, in which certain 2-trihalomethylbenzimidazoles as hereinafter specified are utilized as the essential starting material.

Azolin-2-yl-benzimidazoles in which the azolin-2-yl ring is at the 2-position of the benzimidazole, have utility inter alia as anthelmintics, as described in the specifications of copending patent applications disclosing the 2-imidazolin-2-yl-benzimidazoles, the 2-oxazolin-2-yl-benzimidazoles, and the 2-thiazolin-2-yl-benzimidazoles. In the specifications of said patent applications there is described the preparation of the azolin-2-yl-benzimidazoles by reaction of 2-trichloromethylbenzimidazoles with an alkylenediamine; or an alkanolamine; or a β-mercaptoalkylamine; respectively.

In accordance with the present invention there is provided a process for the preparation of 2-azolin-2-yl-benzimidazoles of the structure formula:

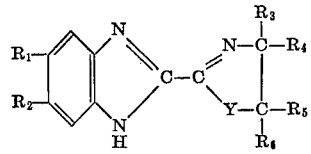

wherein $R_1$ and $R_2$ are selected from hydrogen, halogen, alkyl group containing 1 to 6 carbon atoms inclusive, and alkoxy group containing 1 to 6 carbon atoms inclusive; wherein Y is selected from the group consisting of —NH—, —S—, and —O—; and wherein $R_3$, $R_4$, $R_5$ and $R_6$ are selected from hydrogen and alkyl group containing 1 to 6 carbon atoms inclusive, in the case where Y is —NH— or —S— at least one of $R_3+R_4$ and at least one of $R_5+R_6$ being hydrogen, which process comprises reacting a 2-trihalomethylbenzimidazole having the structural formula:

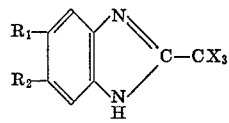

wherein $R_1$ and $R_2$ are as defined above, and wherein $X_3$ represents a mixture of chlorine and fluorine atoms constituting a group selected from monochlorodifluoro and monofluorodichloro groups, with an amine having the structural formula:

$$H_2N \cdot CR_3R_4 \cdot CR_5R_6 \cdot YH$$

wherein Y is as defined above, and wherein $R_3$, $R_4$, $R_5$ and $R_6$ are as defined above with relation to Y. In the process of the invention, $R_1$ and/or $R_2$ conveniently are selected from hydrogen, chlorine, methyl, ethyl, methoxy and ethoxy, while $R_3$, $R_4$, $R_5$ and/or $R_6$ conveniently are selected from hydrogen and methyl, with relation to Y as defined.

Reaction of either of the indicated 2-trihalomethylbenzimidazoles with the specified amine can be effected by bringing the reactants together, preferably under the influence of heat, and preferably in a suitable inert reaction medium. Thus, either of the indicated 2-trihalomethylbenzimidazoles can be reacted with the specified amine in an organic diluent or solvent, such as 1,2-dimethoxyethane or ethyl acetate, to give a more easily controlled reaction, the amine conveniently being in excess of molar requirements, since this serves to neutralize the hydrogen halide formed in the reaction. The order of mixing the reactants is not critical. The desired reaction product can be separated from the reaction medium by conventional methods.

Alternatively, reaction of either of the indicated 2-trihalomethylbenzimidazoles can be effected in a reaction medium consisting essentially of water, and containing a neutralizing amount of a base for neutralization of the hydrogen halide formed in the reaction. Sodium hydroxide is the preferred base for neutralization of the hydrogen halide, however, other alkali metal hydroxides may be used, as well as alkali metal carbonates, particularly sodium carbonate. In general water is the only component of the reaction medium, however, in some cases, when substituents $R_1$ and $R_2$ confere a high degree of insolubility on either of the specified 2-trihalomethylbenzimidazole starting materials, it may be advantageous to add an inert, water-miscible diluent, such as acetone, dioxan, or dimethoxyethane to the water used as solvent. In other cases it may be useful to add small amounts of a wetting agent, such as the material manufactured and sold by Monsanto Company, St. Louis, U.S.A., under the trademark "Santomerse S," in order to accelerate reaction.

In practice, either of the 2-trihalomethylbenzimidazole reactants and the amine reactant can be mixed together in equimolar proportions with three moles of aqueous alkali and the mixture left until reaction is essentially complete. Since the amine reactant is usually the cheaper reactant, it is used in a slight molar excess over the 2-trihalomethylbenzimidazole. In order to minimize any tendency towards hydrolysis of the 2-trihalomethylbenzimidazole by the alkali, it is preferred to add the alkali gradually to an aqueous solution or suspension of the other two reactants, so that the reaction mixture contains only a minor amount of alkali at any given time.

The reaction temperature depends largely upon the nature of the substituents $R_1$, $R_2$ and Y, but is usually in the range of 20–80° C. In most cases a reaction temperature of 40–50° C. ensures that the reaction is essentially complete in a convenient time of 3–4 hours. When the reaction is complete, which is conveniently shown by testing a portion of the mixture for solubility in dilute acid, the product is recovered by conventional means. Usually the product may be separated by filtration, washed with water, and dried. Yields are usually close to quantitative and the products are often obtained in a high state of purity, but further purification may be achieved by normal means, such as recrystallization from a suitable solvent.

Representative examples of either of the 2-trihalomethylbenzimidazole reactants which can be used in the process of the invention are 2-monochlorodifluoromethylbenzimidazole;
2-monofluorodichloromethylbenzimidazole;
2-monochlorodifluoromethyl-5-methylbenzimidazole;
2-monofluorodichloromethyl-5-methylbenzimidazole;
2-monochlorodifluoromethyl-5,6-dimethylbenzimidazole;
2-monofluorodichloromethyl-5,6-dimethylbenzimidazole;
2-monochlorodifluoromethyl-5-methoxybenzimidazole;
2-monofluorodichloromethyl-5-methoxybenzimidazole;
2-monochlorodifluoromethyl-5-chlorobenzimidazole;
2-monofluorodichloromethyl-5-chlorobenzimidazole;
2-monochlorodifluoromethyl-5-bromobenzimidazole;
2-monofluorodichloromethyl-5-bromobenzimidazole;
2-monochlorodifluoromethyl-5,6-dichlorobenzimidazole;
2-monofluorodichloromethyl-5,6-dichlorobenzimidazole.

Representative examples of the amine reactant which can be used in the process of the invention are ethylenediamine; 1,2-propylenediamine; 1,2-diaminobutane; 2,3-diaminobutane; ethanolamine; 1-amino-2-hydroxypropane; 2-amino-2-methylpropan-1-ol; 2-mercaptoethylamine; and 2-mercaptopropylamine.

Salts of the amine reactant may be employed in the process of the invention, for example in the case where Y is sulfur in the above structural formulae, the amine component may be a salt of the β-mercaptoalkylamine, e.g. the hydrochloride, the free amine being generated in situ by the presence of the base in the reaction medium. Moreover, in the case where Y is sulfur in the above structural formulae, the β-mercaptoalkylamine may be prepared in situ by reaction of an appropriate alkylene imine and hydrogen sulfide, according to known procedure, and the reaction product then reacted with either of the 2-trihalomethylbenzimidazole components to produce the desired compounds.

Illustrative of compounds which can be produced by the process of the invention, in the case where Y is —NH— are 2(2′-imidazolin-2′-yl)-benzimidazole; 2-(2′-imidazolin-2′-yl)-5,6-dimethylbenzimidazole; 2-(2′-imidazolin-2′-yl)-5,6-dichlorobenzimidazole; 2-(2′-imidazolin-2′-yl)-5-chlorobenzimidazole; 2-(2′-imidazolin-2′-yl)-5-methylbenzimidazole; 2-(4′-methyl-2′-imidazolin-2′-yl)-5-methylbenzimidazole; and 2-(2′-imidazolin-2′-yl)-5,6-diethylbenzimidazole. Illustrative of the compounds which can be prepared by the process of the invention, in the case wehere Y is —S—, are 2-(2′-thiazolin-2′-yl)-benzimidazole; 2-(2′-thiazolin-2′-yl)-5,6-dimethylbenzimidazole; 2-(2′-thiazolin-2′-yl)-5-chlorobenzimidazole; 2-(2′-thiazolin-2′-yl)-5-methoxybenzimidazole; and 2-(4′-methyl-2′-thiazolin-2′-yl)-benzimidazole. Illustrative of the compounds which can be prepared by the process of the invention, in the case where Y is —O— are 2-(2′-oxazolin-2′-yl)-benzimidazole; 2-(2′-oxazolin-2′-yl)-5,6-dimethylbenzimidazole; 2-(2′-oxazolin-2′-yl)-5-chlorobenzimidazole; 2-(2′-oxazolin-2′-yl)- 5-methoxybenzimidazole; 2-(4′-methyl-2′-oxazolin-2′-yl)-benzimidazole; and 2-(4′,4′-dimethyl-2′-oxazolin-2′-yl)-benzimidazole.

The process of the invention is illustrated by the following non-limitative practical examples:

EXAMPLE 1

Ethylene diamine was added gradually with cooling to a solution of 2-monochlorodifluoromethylbenzimidazole in 1,2-dimethoxyethane. After 15 minutes, the solution was diluted with water giving 2-(2′-imidazolin-2′-yl)-benzimidazole as a pale buff solid. Recrystallization from aqueous acetone gave colorless needles, M.P. 280° C.

EXAMPLE 2

1,2-propylene diamine was added gradually to a hot solution of 2-monochlorodifluoromethylbenzimidazole in 1,2-dimethoxyethane. An exothermic reaction developed and the reaction mixture boiled. The mixture was allowed to cool to room temperature over one hour, then solids were filtered off. The solid consisted of propylene diamine hydrohalide together with some of the required product, which was separated from the hydrochloride by washing with water. Dilution of the reaction mother liquor with petroleum ether gave a further amount of the required product. The combined product was recrystallized from chloroform and from ethyl acetate giving 2-(4′-methyl-2′-imidazolin-2′-yl)-benzimidazole as colorless crystals, M.P. 252° C.

EXAMPLE 3

Ethylene diamine was added gradually to a hot solution of 5(6)-chloro-2-monochlorodifluoromethylbenzimidazole in alcohol. The mixture was allowed to stand for a few hours after the addition was completed. The precipitated ethylene diamine hydrohalide was filtered off, the alcoholic solution was diluted with water to give some unclean product. Addition of 10% sodium carbonate solution precipitated 2-(2′-imidazolin-2′-yl)-5(6)-chlorobenzimidazole as white crystals. Recrystallization from acetonitrile gave colorless needles, M.P. 245° C.

EXAMPLE 4

Ethylene diamine was added slowly to a cooled solution of 5-methyl-2-monochlorodifluoromethylbenzimidazole in chloroform. The precipitate of ethylene diamine hydrohalide was later removed and petroleum ether was then added to precipitate 2-(2′-imidazolin-2′-yl)-benzimidazole. After recrystallization from benzene the solid had M.P. 240° C.

EXAMPLE 5

2-mercaptoethylamine hydrochloride was added to a solution of sodium in ethanol. 2-monochlorodifluoromethylbenzimidazole was added to this solution at room temperature when an exothermic reaction set in. The product was collected after 1 hour, washed with water, and recrystallized from ethanol to give 2-(2′-thiazolin-2′-yl)-benzimidazole as plates, M.P. 292–294° C. (d).

EXAMPLE 6

Ethylene imine in ethanol was added to a solution of ethanol, saturated with hydrogen sulfde by blowing hydrogen sulphide into the solution at 0° C. over ½ hour. After a further 15 minutes the hydrogen sulfide was turned off and the vessel purged with nitrogen. Ethanol was distilled from the mixture, the flask cooled to 20° C. and water added. 2-monochloromethyldifluorobenzimidazole was added over 15 minutes with cooling below 50° C., the reaction was held for 2 hours at 50° C., during this time 40% NaOH solution was added to keep the reaction alkaline to phenolphthalein. The solid was filtered, washed with water and dried. Pure 2-(2′-thiazolin-2′-yl)-benzimidazole, M.P. 285° C. (d) was obtained.

EXAMPLE 7

2 - monochlorodifluoromethyl-5-methylbenzimidazole and mercaptoethylamine hydrochloride in chloroform were treated with triethylamine in chloroform. There was a transient red coloration during the addition of the base and the final reaction mixture was alkaline. The reaction mixture was evaporated to dryness on a steam bath and the residue washed with water before recrystallization from cyclohexane and from carbon tetrachloride to give colorless needles, M.P. 206–7° C., of 2-(2'-thiazolin-2'-yl)-5-methylbenzimidazole.

EXAMPLE 8

Ethanolamine was added to a hot solution of 2-monochlorodifluoromethylbenzimidazole in 1,2 - dimethoxymethane. An immediate reaction occurred and solid was precipitated. The reaction mixture was allowed to cool to room temperature over 2 hours, then the solid was filtered off and washed with water giving 2-(2'-oxazolin-2'-yl)-benzimidazole. Recrystallization from methanol gave colorless prisms, M.P. 268° C.

EXAMPLE 9

2-monochlorodifluoromethylbenzimidazole was added over 15 minutes to a solution of ethylenediamine in water containing "Santomerse S" with cooling below 50° C. The thick slurry was stirred below 50° C., while 40% sodium hydroxide solution was added over 1 hour at such a rate that the solution remained alkaline to phenolphthalein. The mixture was then stirred at 70° C., for 2 hours then 2-(2'-imidazolin-2'-yl)-benzimidazole, M.P. 280° C. (d), was filtered off, washed with water and dried.

EXAMPLE 10

2-monochlorodifluoromethylbenzimidazole was added over ½ hour to a solution of ethanolamine in water with cooling below 40° C. The slurry was stirred at 40–50° C., while 40° sodium hydroxide solution was added gradually over 2 hours to keep the solution alkaline to phenolphthalein. The mixture was cooled to 20° C., and the resultant 2-(2'-oxazolin-2'-yl)-benzimidazole M.P. ca. 200° C., was filtered off, washed with water, and dried. The M.P. of the product was raised appreciably by slurrying with hot ethanol to remove soluble impurities.

EXAMPLE 11

2 - monochlorodifluoromethylbenzimidazole, 2-mercaptoethylamine hydrochloride, and "Santomerse S" were mixed in water and cooled to 10° C. The mixture was stirred below 10° C., for 3 hours while 40% sodium hydroxide solution was added dropwise to keep the solution alkaline to phenolphthalein. After a further period of 2 hours at 20° C., the solid was filtered off, washed with water, and dried. Slightly impure 2-(2'-thiazolin-2'-yl)-benzimidazole, M.P. 255–260° C., was obtained. The product was purified by recrystallization from dimethylformamide, which raised the M.P. to 298–2990 C.

The specified 2-trihalomethyl benzimidazoles employed as the essential material in the process of the invention, and having the structural formula:

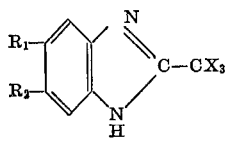

wherein $R_1$, $R_2$ and $X_3$ are as defined above can be prepared by the method which comprises reacting an appropriate o-phenylenediamine with monochlorodifluoroacetic acid or monofluorodichloroacetic acid. Reaction of the o-phenylenediamine and either of the specified acids can be effected by bringing the reactants together, suitably with the application of heat. This is conveniently effected in an aqueous reaction medium, or in a dilute mineral acid solution such as 4 N hydrochloric acid, preferably by refluxing for a suitable period. The reaction product can be isolated by addition of a base, such as 10% sodium carbonate solution, and, if desired, purified by conventional procedures, the isolated material then being used for the purpose of the invention. Alternatively, the reaction mass resulting from the preparation of the specified 2-trihalomethylbenzimidazole may be employed in the process of the invention, without isolating the 2-trihalomethylbenzimidazole reaction product from the reaction mass.

The embodiments of the invention in which an exclusive property or privilege is claimed are defined as follows:

1. Process for the preparation of benzimidazoles of the formula:

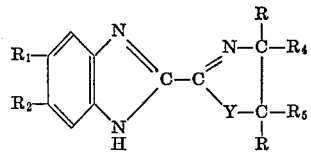

wherein $R_1$ and $R_2$ are selected from the group consisting of hydrogen, halogen, alkyl of not more than 6 carbon atoms, and alkoxy of not more than 6 carbon atoms, Y is selected from the group consisting of —NH—, —S—, and —O—, and $R_3$, $R_4$, $R_5$ and $R_6$ are selected from the group consisting of hydrogen and alkyl of not more than 6 carbon atoms, provided that where Y is —NH— or —S— at least one of $R_3$ and $R_4$, and at least one of $R_5$ and $R_6$ are hydrogen, which comprises reacting a trihalomethylbenzimidazole of the formula:

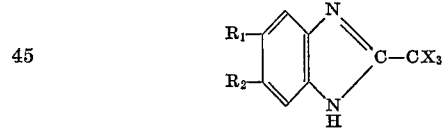

wherein $R_1$ and $R_2$ are as defined above, and $X_3$ is selected from the group consisting of monochlorodifluoro and monofluorodichloro, with an amine of the formula:

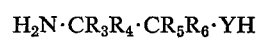

wherein Y, $R_3$, $R_4$, $R_5$ and $R_6$ are as defined above.

2. Process of claim 1 wherein Y is —NH—.
3. Process of claim 1 wherein Y is —S—.
4. Process of claim 1 wherein Y is —O—.
5. Process of claim 1 wherein the trihalomethylbenzimidazole is selected from the group consisting of 2-monochlorodifluoromethylbenzimidazole;
2-monofluorodichloromethylbenzimidazole;
2-monochlorodifluoromethyl-5-methylbenzimidazole;
2-monofluorodichloromethyl-5-methylbenzimidazole;
2-monochlorodifluoromethyl-5,6-dimethylbenzimidazole;
2-monofluorodichloromethyl-5,6-dimethylbenzimidazole;
2-monochlorodifluoromethyl-5-methoxybenzimidazole;
2-monofluorodichloromethyl-5-methoxybenzimidazole;
2-monochlorodifluoromethyl-5-chlorobenzimidazole;
2-monofluorodichloromethyl-5-chlorobenzimidazole;
2-monochlorodifluoromethyl-5-bromobenzimidazole;
2-monofluorodichloromethyl-5-bromobenzimidazole;

2-monochlorodifluoromethyl-5,6-dichlorobenzimidazole;
2-monofluorodichloromethyl-5,6-dichlorobenzimidazole;
and the amine reactant is selected from ethylenediamine;
1,2-propylenediamine; 1,2 - diaminobutane; 2,3 - diaminobutane; ethanolamine; 1 - amino - 2 - hydroxypropane;
2 - amino - 2-methylpropan-1-ol-; 2-mercaptoethylamine;
and 2-mercaptopropylamine.

6. Process of claim 1 wherein the reaction is carried out in the presence of an organic diluent.

7. Process of claim 1 wherein the reaction is carried out in the presence of an aqueous reaction medium.

References Cited

UNITED STATES PATENTS

| 3,399,208 | 8/1968 | Holan et al | 260—306.7 |
| 3,377,239 | 4/1968 | Holan | 260—306.7 |

ALEX MAZEL, Primary Examiner

R. J. GALLAGHER, Assistant Examiner

U.S. Cl. X.R.

260—307, 309.2, 999